United States Patent
Nagai et al.

(10) Patent No.: US 11,075,828 B2
(45) Date of Patent: Jul. 27, 2021

(54) INFORMATION COLLECTING SYSTEM, INFORMATION COLLECTING MEDIATION DEVICE, INFORMATION COLLECTING MEDIATION METHOD, AND RECORDING MEDIUM

(71) Applicant: YOKOGAWA ELECTRIC CORPORATION, Tokyo (JP)

(72) Inventors: Eiji Nagai, Musashino (JP); Hiroshi Iriguchi, Musashino (JP); Masatoshi Takubo, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 89 days.

(21) Appl. No.: 16/138,433

(22) Filed: Sep. 21, 2018

(65) Prior Publication Data

US 2019/0097906 A1    Mar. 28, 2019

(30) Foreign Application Priority Data

Sep. 22, 2017 (JP) .............................. JP2017-182346

(51) Int. Cl.
  *G06F 15/173* (2006.01)
  *H04L 12/26* (2006.01)
  (Continued)

(52) U.S. Cl.
  CPC ...... *H04L 43/0817* (2013.01); *G05B 19/4185* (2013.01); *H04L 67/12* (2013.01);
  (Continued)

(58) Field of Classification Search
  CPC . H04L 43/0817; H04L 67/12; G05B 19/4185; G05B 23/0208;
  (Continued)

(56) References Cited

U.S. PATENT DOCUMENTS

2004/0162887 A1* 8/2004 Dillon ................ G05B 19/4185
                                                                                  709/217
2009/0059944 A1* 3/2009 Omino ................ H04L 43/0817
                                                                                  370/419
(Continued)

FOREIGN PATENT DOCUMENTS

JP      H11231927 A      8/1999
JP      200699809 A      4/2006
(Continued)

OTHER PUBLICATIONS

Extended European Search Report issued in European Application No. 18195901.6; dated Feb. 13, 2019 (11 pages).

Primary Examiner — Anh Nguyen
(74) Attorney, Agent, or Firm — Osha Bergman Watanabe & Burton LLP

(57) ABSTRACT

An information collecting system collects information associated with (i) a controller connected to a control network and (ii) a host device connected to an information network located at a level higher than the control network, and includes a management device and an information collecting mediation device. The management device is connected to the information network, collects information associated with the host device, transmits an acquisition request for information associated with the controller to the information network, and manages the collected information associated with the host device and information associated with the controller. The information collecting mediation device is connected to the control network and the information network, collects information associated with the controller according to capability information indicating a capability of at least one of the control network and the controller based on the acquisition request, and sends said collected information to the management device.

13 Claims, 6 Drawing Sheets

(51) Int. Cl.
    *G05B 19/418*   (2006.01)
    *H04L 29/08*    (2006.01)
    *G05B 23/02*    (2006.01)

(52) U.S. Cl.
    CPC    *G05B 23/0208* (2013.01); *G05B 2219/31115* (2013.01); *G05B 2219/31124* (2013.01); *G05B 2219/34279* (2013.01)

(58) Field of Classification Search
    CPC    G05B 2219/31124; G05B 2219/31115; G05B 2219/34279; Y02P 90/02
    USPC ......................................................... 709/224
    See application file for complete search history.

(56) References Cited

U.S. PATENT DOCUMENTS

2012/0089239 A1* 4/2012 Sentgeorge ............. H04L 41/12
                                                                        700/2
2014/0067089 A1   3/2014 Kanbe et al.
2016/0294644 A1* 10/2016 Pacella ............... H04L 41/5054
2019/0007929 A1*  1/2019 Senderovitz ........ H04L 41/0853

FOREIGN PATENT DOCUMENTS

JP          5652444 B2    1/2015
JP       2015141644 A     8/2015

* cited by examiner

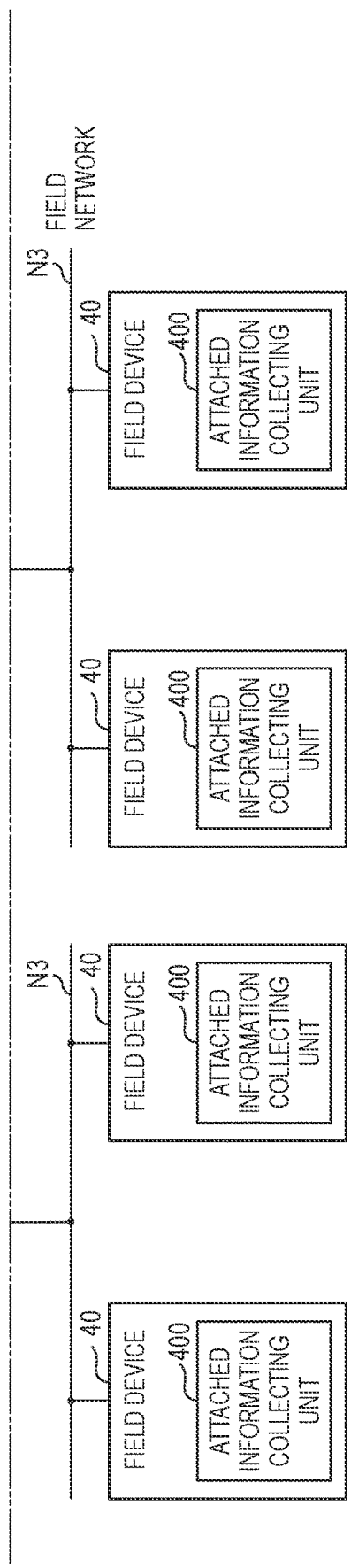

INFORMATION COLLECTING SYSTEM, INFORMATION COLLECTING MEDIATION DEVICE, INFORMATION COLLECTING MEDIATION METHOD, AND RECORDING MEDIUM

CROSS-REFERENCE TO RELATED APPLICATION

The present application claims priority from Japanese Patent Application No. 2017-182346 filed on Sep. 22, 2017, the entire content of which is incorporated herein by reference.

BACKGROUND

Technical Field

The present invention relates to an information collecting system, an information collecting mediation device, an information collecting mediation method, and a recording medium.

Related Art

Advanced automatic operation is realized in plants, factories and the like (hereinafter simply referred to as "plant") since a process control system has been constructed to control state quantities (for example, pressure, temperature, and flow rate) in an industrial process. In this process control system, an on-site device (a sensor and an actuator) that is generally called a field device and a controller that controls the field device are connected via communication means, and the controller collects process values (for example, measurement values of pressure, temperature, flow rate, and the like) acquired by the field device to operate (control) the field device, such that the state quantities are under control.

The process control system is required for safe and flexible operation over a long period of time equal to or longer than the operating period of the plant (for example, 30 years or more). In such a process control system, components constituting the process control system are frequently changed (for example, replacement of a device and version upgrade of software) due to deterioration of facilities provided in the plant, change of processes or materials, efficiency improvement, or maintenance and improvement of functions of the process control system. Therefore, it is important to constantly collect and manage latest information related to the components (for example, a field device, a controller, a network, and programs used in the process control system) constituting the process control system, so as to enable flexible operation of the process control system over a long period.

JP-B-5652444 discloses a maintenance support system including a specification information database that stores specification information indicating specifications of a process control system and an actual state information extraction device that extracts actual state information indicating an actual state of the process control system. In the process control system, the actual state information extracted by the actual state information extraction device is compared with the specification information of the specification information database to output information indicating the comparison result.

Information (hereinafter, referred to as "attached information") related to components constituting a process control system needs to be collected at a timing at which process control that is the main process of the process control system is not influenced. For example, the attached information is collected at a timing at which the process control system is not fully operated, for example, when the system is introduced, extended, renovated, or at periodic inspection. In such a case, the timing at which the attached information can be collected is limited to a specific timing.

Examples of influences include, for example, an increase in loads of the process control system and a decrease in the operation rate of the process control that is the main process due to the collection of the attached information, or a decrease in responsiveness and real-time property of the process control.

Attached information may also be collected when the process control system is fully operated. In such a case, the collection is performed, for example, after the production facilities are put into a stable operation state. However, production efficiency of the facilities is reduced.

In addition, since the process control system is provided with a plurality of devices (controllers) that control different facilities respectively, the collection of attached information depends on the operation state of the facilities, and is performed at different timings. Therefore, when attached information is collected during full-scale operation of the process control system, there may be no consistency of attached information among the devices due to different timings for the devices. Particularly, inconsistency may occur when information of the entire process control system is analyzed.

SUMMARY

One or more embodiments of the present invention provide an information collecting system, an information collecting mediation device, an information collecting mediation method, and a recording medium, in which attached information having consistency of information can be collected at any timing without influencing the process control.

(1) One aspect of the present invention provides an information collecting system for collecting information associated with (i) a controller connected to a control network and (ii) a host device connected to an information network located at a level higher than the control network that are included in a process control system. The information collecting system includes a management device and an information collecting mediation device. The management device is connected to the information network, collects information associated with the host device, transmits an acquisition request for information associated with the controller to the information network, and manages the collected information associated with the host device and information associated with the controller obtained by transmitting the acquisition request. The information collecting mediation device is connected to the control network and the information network, collects information associated with the controller in consideration of (i.e., according to) capability information indicating a capability of at least one of the control network and the controller based on the acquisition request from the management device, and sends the collected information associated with the controller to the management device.

(2) In the information collecting system according to one aspect of the present invention, the information collecting mediation device adjusts at least one of an information amount for collecting the information associated with the controller at one time and a timing at which the information associated with the controller is collected, based on the capability information of at least one of the control network and the controller.

(3) In the information collecting system according to one aspect of the present invention, the information collecting mediation device adjusts the information amount by dividing and collecting the information associated with the controller, combines the collected divided information, and transmits the combined information to the management device.

(4) In the information collecting system according to one aspect of the present invention, the information collecting mediation device transmits, to the management device, difference information indicating a difference between previously collected information associated with the controller and currently collected information associated with the controller.

(5) In the information collecting system according to one aspect of the present invention, when the currently collected information is the same as the previously collected information, the information collecting mediation device outputs acknowledge information indicating that a mediation request is normally received.

(6) In the information collecting system according to one aspect of the present invention, the controller is connected to a field network, collects information associated with a field device connected to the field network in consideration of capability information indicating a capability of at least one of the field network and the field device, based on an acquisition request from the information collecting mediation device, and sends the collected information associated with the field device to the information collecting mediation device.

(7) In the information collecting system according to one aspect of the present invention, the information collecting mediation device collects information associated with a field device in consideration of capability information indicating a capability of at least one of the control network and the field device connected to the control network based on the acquisition request from the management device, and sends the collected information associated with the field device to the management device.

(8) In the information collecting system according to one aspect of the present invention, the capability information includes at least one of communication loads for communication of the information associated with the controller in the control network, processing loads for collection of the information associated with the controller in the controller, information related to a function of suppressing loads of the controller and information indicating that the controller does not have the function of suppressing loads.

(9) In the information collecting system according to one aspect of the present invention, the information collecting mediation device is configured to be introduced into the host device while maintaining operation of the process control system.

(10) One aspect of the present invention provides an information collecting mediation device connected to a control network and an information network in a process control system that includes (i) a controller connected to the control network and (ii) a host device connected to the information network located at a level higher than the control network. The information collecting mediation device collects information associated with the controller in consideration of capability information indicating a capability of at least one of the control network and the controller based on an information acquisition request transmitted via the information network, and sends the collected information associated with the controller to the information network toward a transmission source of the information acquisition request.

(11) One aspect of the present invention provides an information collecting mediation method using a computer connected to a control network and an information network in a process control system that includes (i) a controller connected to the control network and (ii) a host device connected to the information network located at a level higher than the control network. The information collecting mediation method includes: collecting information associated with the controller in consideration of capability information indicating a capability of at least one of the control network and the controller based on an information acquisition request transmitted via the information network, and sends the collected information associated with the controller to the information network toward a transmission source of the information acquisition request.

(12) One aspect of the present invention provides a non-transitory computer-readable recording medium having an information collecting mediation program on a computer connected to a control network and an information network in a process control system that includes (i) a controller connected to the control network and (ii) a host device connected to the information network located at a level higher than the control network. The information collecting mediation program executing: collecting information associated with the controller in consideration of capability information indicating a capability of at least one of the control network and the controller based on an information acquisition request transmitted via the information network, and sends the collected information associated with the controller to the information network toward a transmission source of the information acquisition request.

According to one or more embodiments of the present invention, attached information having consistency of information can be collected at any timing without influencing the process control.

DETAILED DESCRIPTION

Hereinafter, embodiments of the present invention are described.

Configuration of Information Collecting System

Hereinafter, a configuration of an information collecting system 1a is described with reference to the drawings.

Figure 1:
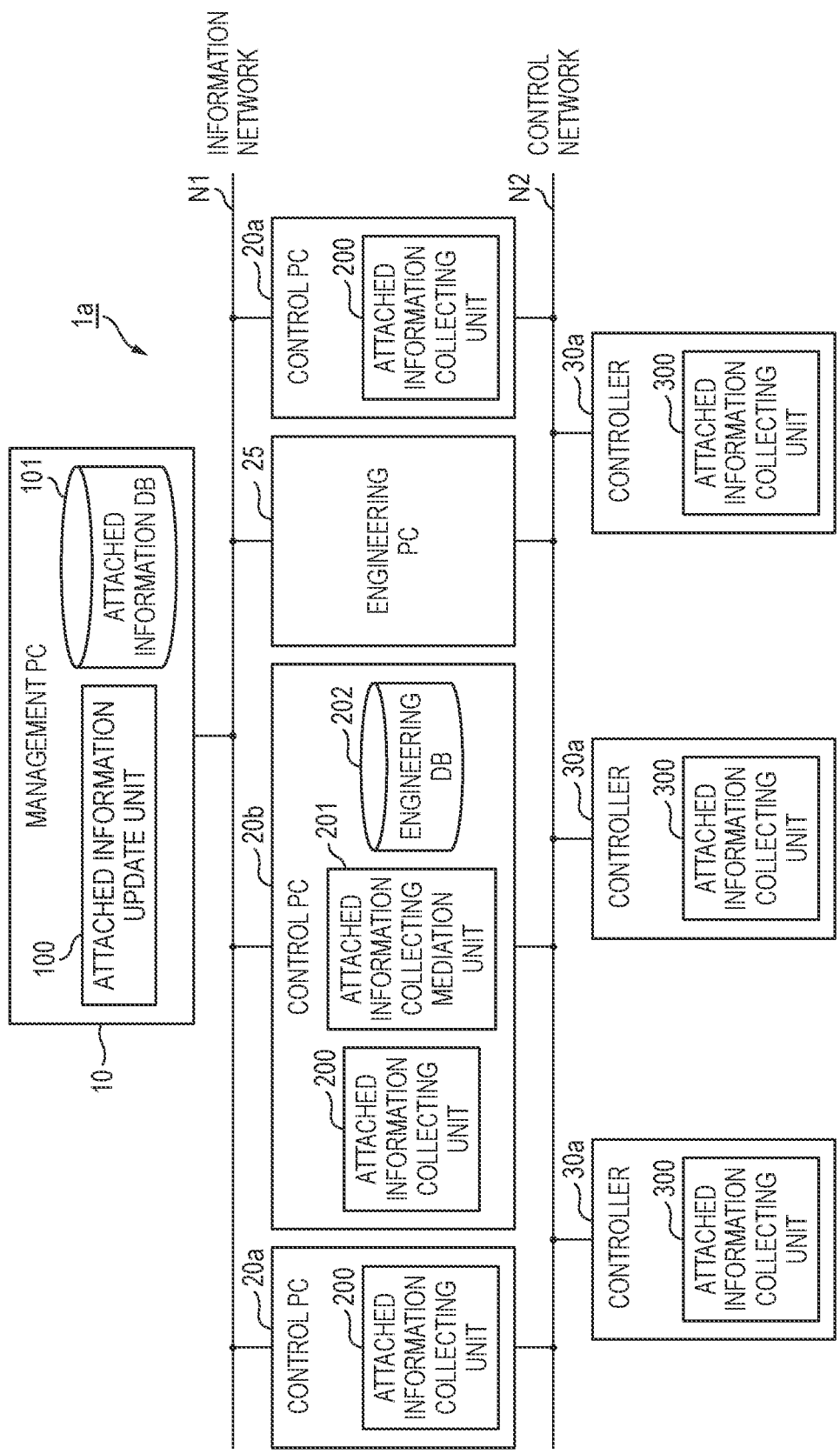
FIG. 1 is a schematic diagram illustrating an overall configuration of an information collecting system according to one or more embodiments of the present invention.

FIG. 1 is a schematic diagram illustrating an overall configuration of the information collecting system 1*a* according to the one or more embodiments of the present invention. The information collecting system 1*a* according to one or more embodiments collects information related to a controller and a control device that controls the controller, in a process control system installed in a plant. In one or more embodiments, the process controlled by the process control system is a production process of a product, and the process control system is a production system (not all illustrated).

As illustrated in FIG. 1, the information collecting system 1*a* includes a management PC 10, a plurality of control PCs 20*a*, a control PC 20*b*, an engineering PC 25, a plurality of controllers 30*a*, an information network N1 and a control network N2.

In the production system (not all illustrated), the plurality of controllers 30*a* control field devices (not illustrated) such as a sensor and an actuator respectively connected to the controllers 30*a* under monitoring of the control PCs 20*a* and the control PC 20*b* that are operation management devices, such that an industrial process (production process) realized in the plant is under control.

As illustrated in FIG. 1, the management PC 10 is communicably connected to the control PCs 20*a*, the control PC 20*b*, and the engineering PC 25 respectively via the information network N1. The information network N1 is, for example, installed in a monitoring room of the plant.

As illustrated in FIG. 1, the controllers 30*a* are communicably connected to the control PCs 20*a*, the control PC 20*b*, and the engineering PC 25 respectively via the control network N2. The control network N2, for example, connects active sites of the plant and the monitoring room, such that real-time communication is performed.

Although the information network N1 and the control network N2 are illustrated in a simplified manner in FIG. 1, these networks are actually configured by such as a network switch. The information network N1 and the control network N2 may be wired or wireless networks or a combination of both.

The management PC 10 (management device) manages attached information of the entire information collecting system 1*a*. The management PC 10 is, for example, a personal computer (PC). The management PC 10 may also be an information processing device other than a PC, such as a general-purpose computer or a tablet type small information terminal.

As illustrated in FIG. 1, the management PC 10 is connected to the information network N1. The management PC 10 includes an attached information update unit 100 and an attached information DB (database) 101.

The attached information update unit 100 transmits information indicating a request to collect attached information (hereinafter, referred to as "collection request") respectively to attached information collecting units 200 of the control PCs 20*a* and an attached information collecting unit 200 of the control PC 20*b* to be described below via the information network N1. In this way, the attached information update unit 100 can collect latest attached information related to each of the control PCs 20*a* and the control PC 20*b*.

Additionally, the attached information update unit 100 regularly (for example, every week) transmits a collection request to the control PCs 20*a* and the control PC 20*b*.

The attached information update unit 100 transmits information indicating a request to mediate collection of attached information (hereinafter, referred to as "mediation request") to an attached information collecting mediation unit 201 of the control PC 20*b* to be described below via the information network N1. In this way, the attached information update unit 100 can collect latest attached information related to each of the controllers 30*a* via the attached information collecting mediation unit 201.

The attached information update unit 100 updates previously collected attached information stored in the attached information DB 101, with latest attached information of the control PCs 20*a*, the control PC 20*b*, and the controllers 30*a*.

The attached information DB 101 stores attached information collected by the attached information update unit 100. The attached information DB 101 includes a storage medium such as a hard disk drive (HDD), a flash memory, an Electrically Erasable Programmable Read Only Memory (EEPROM), a random access read/write memory (RAM), a Read Only Memory (ROM) or any combination of these storage media.

The attached information is used for management (for example, maintenance) of the production system (not all illustrated). Specifically, the management PC 10 collects and manages the following attached information related to the control PCs 20*a*, the control PC 20*b*, and the controllers 30*a*.

- Information indicating device configurations, versions, model numbers, and identification numbers of the control PCs 20*a* and the control PC 20*b*
- Information indicating setting contents, installation contents of the control PCs 20*a* and the control PC 20*b* and change histories of these contents
- Information indicating port numbers used in the control PCs 20*a* and the control PC 20*b*
- Information indicating OSs used in the control PCs 20*a* and the control PC 20*b* and versions thereof
- Information indicating firmware used in the control PCs 20*a* and the control PC 20*b* and versions thereof
- Information indicating application programs used in the control PCs 20*a* and the control PC 20*b* and versions, sizes, accounts of users, and security settings thereof
- Information indicating patch programs applied to the control PCs 20*a* and the control PC 20*b* and versions thereof
- Information indicating screen settings of the control PCs 20*a* and the control PC 20*b*
- Information indicating device configurations, versions, model numbers, and identification numbers of the controllers 30*a*
- Information indicating setting contents, installation contents of the controllers 30*a* and change histories of these contents
- Information indicating port numbers used in the controllers 30*a*
- Information indicating control programs used in the controllers 30*a* and versions thereof
- Source code (if necessary) of the control programs used in the controllers 30*a*

As illustrated in FIG. 1, the control PCs 20*a* (host devices) are connected to the information network N1 and the control network N2. The control PCs 20*a* monitor and manage the controllers 30*a* and field devices (not illustrated) (for example, a sensor) connected to the controllers 30*a*. Specifically, the control PCs 20*a* operate and monitor the field devices (not illustrated) by exchanging parameters with the controllers 30*a* via the control network N2. For example, the control PCs 20*a* acquire parameters set in the field devices (not illustrated) from the controllers 30*a* to grasp current measurement conditions, and set new parameters in the field devices (not illustrated) for the controllers 30*a* to change the measurement conditions. Further, the control PCs 20*a* provide the controllers 30a with setting values and operation amounts of the field devices (not illustrated) such as an actuator to perform control.

The control PCs 20a are, for example, personal computers (PC). The control PCs 20a may also be information processing devices other than PCs, such as a general-purpose computer or a tablet type small information terminal. Each of the control PCs 20a includes an input device (not illustrated) such as a keyboard or a pointing device, and a display device (not illustrated) such as a liquid crystal display. The control PCs 20a display monitoring results of the field devices (not illustrated) and the controllers 30a on display devices (not illustrated) to provide information indicating the state of the plant to such as an operator (operator of the plant), and control the controllers 30a based on an instruction input by the operator and the like via input devices (not illustrated).

As illustrated in FIG. 1, each of the control PCs 20a includes an attached information collecting unit 200.

The attached information collecting units 200 acquire a collection request transmitted from the attached information update unit 100 of the management PC 10 via the information network N1. The attached information collecting units 200 collect attached information related to corresponding control PCs 20a based on the acquired collection request. The attached information collecting units 200 transmit the collected attached information to the attached information update unit 100 of the management PC 10 via the information network N1. Here, the attached information collecting units 200 control loads so as not to apply a load to other applications of the control PCs 20a.

As illustrated in FIG. 1, the control PC 20b (host device and information collecting mediation device) is connected to the information network N1 and the control network N2. In the control PC 20b, the information collecting mediation unit 201 and an engineering DB 202 are added to the configuration of the control PCs 20a described above.

Configurations of the engineering DB 202 and the engineering PC 25 illustrated in FIG. 1 are described below.

The attached information collecting mediation unit 201 acquires a mediation request transmitted from the attached information update unit 100 of the management PC 10 via the information network N1. Upon acquiring the mediation request, the attached information collecting mediation unit 201 transmits, via the control network N2, a collection request indicating a request to collect attachment information respectively to attached information collecting units 300 of the controllers 30a to be described below. In this way, the attached information collecting mediation unit 201 can collect latest attached information related to each of the controllers 30a.

The attached information collecting mediation unit 201 transmits the collected attached information to the attached information update unit 100 of the management PC 10 via the information network N1.

The attached information collecting mediation unit 201 stores information indicating capabilities of the control network N2 and the controllers 30a (hereinafter referred to as "capability information"). Specifically, the attached information collecting mediation unit 201 stores the following capability information.

Additional allowed communication loads for communication of attached information in the control network N2

Additional allowed processing loads for collection of attached information in the controllers 30a Information related to a function of suppressing loads of the controllers 30a or information indicating that the controllers 30a do not have the function of suppressing loads The above "allowed" refers that the process control (production process) of the production system (not all illustrated) is not influenced.

The attached information collecting mediation unit 201 transmits the collection request to the attached information collecting units 300 of the controllers 30a to be described below in consideration of capabilities indicated by the above capability information. Specifically, the attached information collecting mediation unit 201 transmits the collection request by adjusting a transmission frequency (timing) of the collection request or by adjusting a communication amount in the control network N2 via adjusting an information amount requested to be collected based on, for example, the capabilities indicated by the above capability information.

As illustrated in FIG. 1, the controllers 30a are connected to the control network N2. The controllers 30a control state quantities (for example, a flow rate of fluid) in the industrial process (production process) under monitoring of the control PCs 20a or the control PC 20b. Specifically, for example, under the monitoring of the control PCs 20a or the control PC 20b, the controllers 30a collect measurement data from a field device (not illustrated) that is a sensor, obtain control amounts of a field device (not illustrated) that is an actuator based on the collected measurement data, and control the field device (not illustrated) that is an actuator.

As illustrated in FIG. 1, each of the controllers 30a includes an attached information collecting unit 300.

The attached information collecting units 300 acquire the collection request transmitted from the attached information collecting mediation unit 201 of the control PC 20b via the control network N2. The attached information collecting units 300 collect attached information related to corresponding controllers 30a based on the acquired collection request. The attached information collecting units 300 transmit the collected attached information to the attached information collecting mediation unit 201 of the control PC 20b via the control network N2.

The attached information collecting units 300 have a function of suppressing loads due to collection of attached information in order to prevent an influence on the process control (production process) performed via the controllers 30a. Specifically, for example, the attached information collecting units 300 suppress loads by controlling thread priority, suppressing a usage rate of a Central Processing Unit (CPU), and the like.

Mediation of Collection of Attached Information

Mediation of collection of attached information is described below with reference to the drawings.

Figure 2:
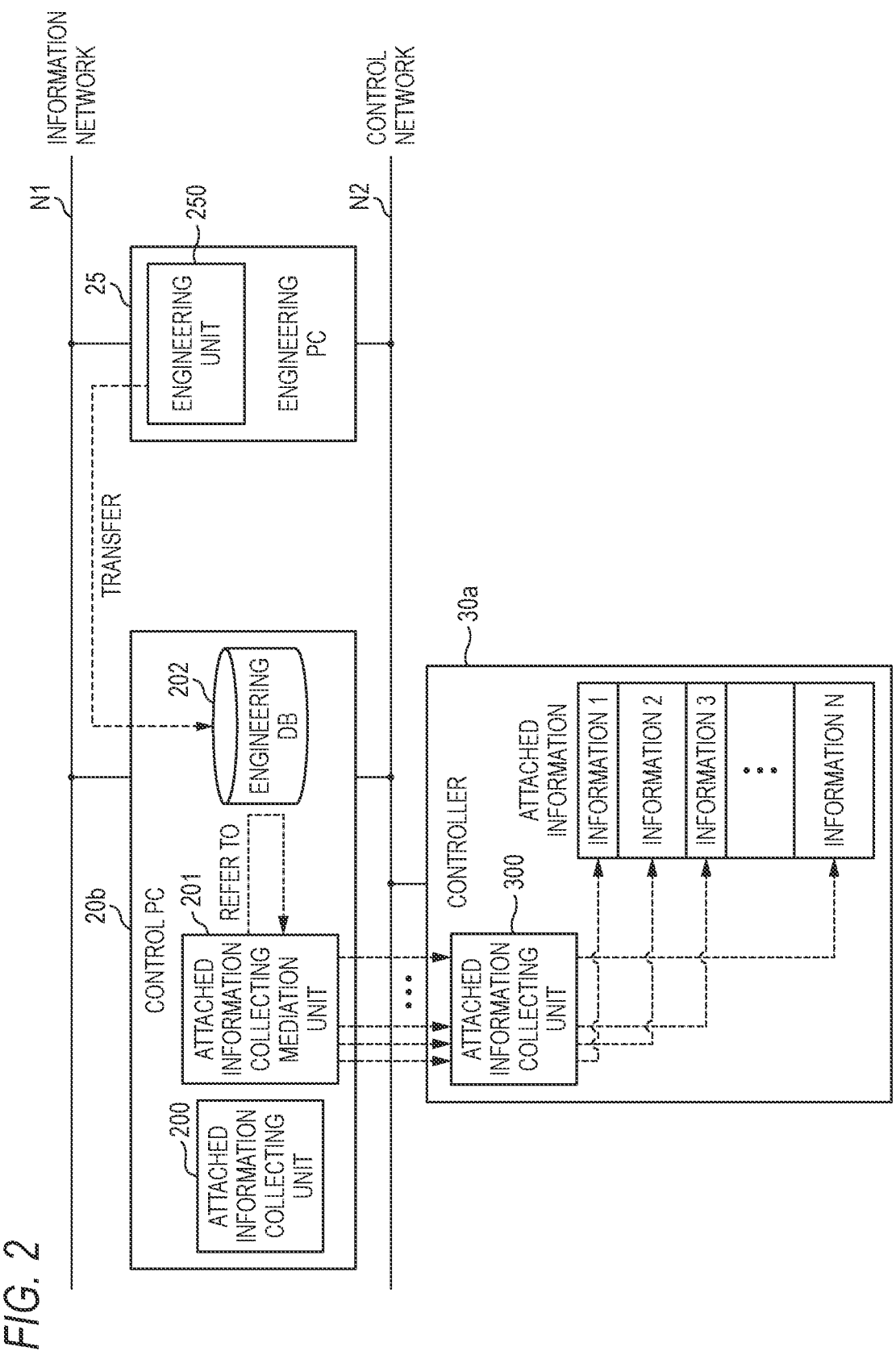
FIG. 2 is a schematic diagram illustrating a process of collecting attached information by a control PC of the information collecting system according to one or more embodiments of the present invention.

FIG. 2 is a schematic diagram illustrating a process of mediating the collection of attached information by the control PC 20b of the information collecting system 1a according to the one or more embodiments of the present invention. As illustrated in FIG. 2, the engineering PC 25 is connected to the information network N1 and the control network N2.

The engineering PC 25 is used to maintain the production system (not all illustrated). The engineering PC 25 is, for example, a personal computer (PC). The engineering PC 25 may also be an information processing device other than a PC, such as a general-purpose computer or a tablet type small information terminal. The engineering PC 25 includes an input device (not illustrated) such as a keyboard or a pointing device, and a display device (not illustrated) such as a liquid crystal display. The engineering PC 25 is operated by, for example, an engineer that maintains the production system (not all illustrated), defines components (for example, the controllers 30*a*) of the production system (not illustrated) based on an instruction from the engineer, and sets parameters of the components.

As illustrated in FIG. 2, the engineering PC 25 includes an engineering unit 250.

The engineering unit 250 transfers the above capability information to the engineering DB 202 of the control PC 20*b*. The capability information transferred here indicates capabilities of a target device (that is, a controller 30*a*) that the attached information collecting mediation unit 201 of the control PC 20*b* mediates and of a target network (that is, the control network N2).

Although the engineering unit 250 transfers the capability information to the engineering DB 202 of the control PC 20*b* in the above description, the present invention is not limited thereto. For example, the engineering unit 250 may transmit information related to definitions of the above components (for example, types of the controllers 30*a*) and parameter settings of these components to the engineering DB 202 of the control PC 20*b*, such that the attached information collecting mediation unit 201 of the control PC 20*b* determines capabilities of the components based on the acquired information and transmits a collection request.

The engineering DB 202 stores the capability information acquired by the engineering unit 250 of the engineering PC 25. The engineering DB 202 includes a storage medium such as an HDD, a flash memory, an EEPROM, a RAM, a ROM, or any combination of these storage media.

The capability information may be input by an engineer in the engineering PC 25, or acquired from an external device (DB) by the engineering PC 25.

The transfer of capability information from the engineering unit 250 of the engineering PC 25 to the engineering DB 202 of the control PC 20*b* is performed when contents of engineering (a configuration or setting of a device) is changed.

The attached information collecting mediation unit 201, upon acquiring the mediation request, specifies the target device and a capability of the target device by referring to the capability information stored in the engineering DB 202.

Based on the capability of the specified controller 30*a*, for example, as illustrated in FIG. 2, the attached information collecting mediation unit 201 transmits a collection request to the attached information collecting unit 300 of the controller 30*a* for N times at an appropriate transmission interval, so as to partially acquire attached information in a plurality of times (N times).

Whenever the attached information collecting unit 300 acquires a collection request transmitted from the attached information collecting mediation unit 201, the attached information collection unit 300 transmits a part of the attached information (for example, one of N pieces of the attached information) corresponding to a request of the collection request to the attached information collecting mediation unit 201.

The attached information collecting mediation unit 201, upon acquiring all of the divided N pieces of attached information, combines the divided N pieces of attached information and transmits the combined attached information to the management PC 10 that is a transmission source of the mediation request.

When the attached information includes a plurality of independent (small in size) information, the attached information collecting mediation unit 201 may transmit a collection request to acquire each of the independent information. When the attached information includes information having a large size, the attached information collecting mediation unit 201 may, by specifying a range (region) for acquisition requests of attached information, transmit a collection request for a plurality of times so as to acquire the information having a large size respectively.

Operation of Control PC in Collecting Attached Information

Hereinafter, operation of the control PCs 20*a* or the control PC 20*b* in collecting attached information is described with reference to the drawings.

Figure 3:
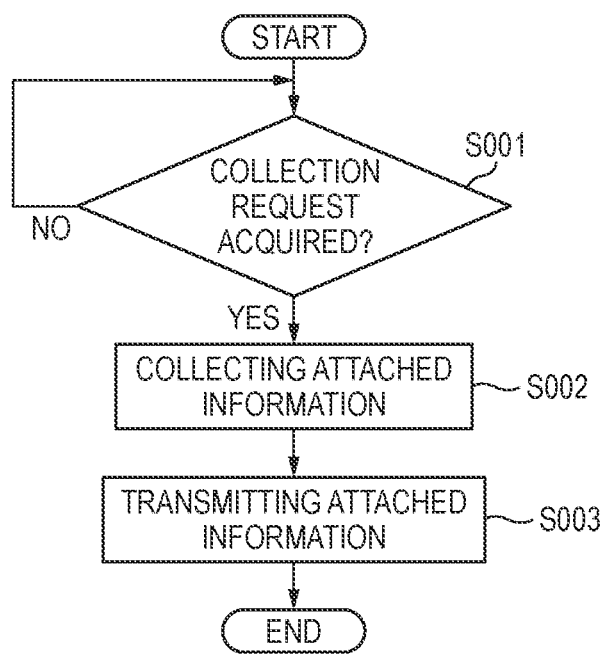
FIG. 3 is a flow chart illustrating operation of the control PC of the information collecting system according to one or more embodiments of the present invention.

FIG. 3 is a flow chart illustrating operation of the control PCs 20*a* or the control PC 20*b* of the information collecting system 1*a* according to one or more embodiments of the present invention. The flow chart illustrated in FIG. 3 starts when a collection request is transmitted from the attached information update unit 100 of the management PC 10 to the attached information collecting unit 200 of the control PCs 20*a* or the control PC 20*b* via the information network N1.

(Step S001) When the attached information collecting unit 200 of the control PCs 20*a* or the control PC 20*b* acquires the collection request transmitted from the attached information update unit 100 of the management PC 10 via the information network N1, the process proceeds to Step S002. Otherwise (that is, when the collection request is not acquired), the process remains in Step S001.

(Step S002) The attached information collecting unit 200 of the control PCs 20*a* or the control PC 20*b* collects attached information related to the control PCs 20*a* or the control PC 20*b* based on the collection request acquired in Step S001. Thereafter, the process proceeds to Step S003.

(Step S003) The attached information collecting unit 200 of the control PCs 20*a* or the control PC 20*b* transmits the attached information collected in Step S002 to the attached information update unit 100 of the management PC 10 via the information network N1.

Processing of the flow chart illustrated in FIG. 3 ends.

Operation of Control PC in Mediating Collection of Attached Information

Hereinafter, operation of the control PC 20*b* in mediating collection of attached information is described with reference to the drawings.

Figure 4:
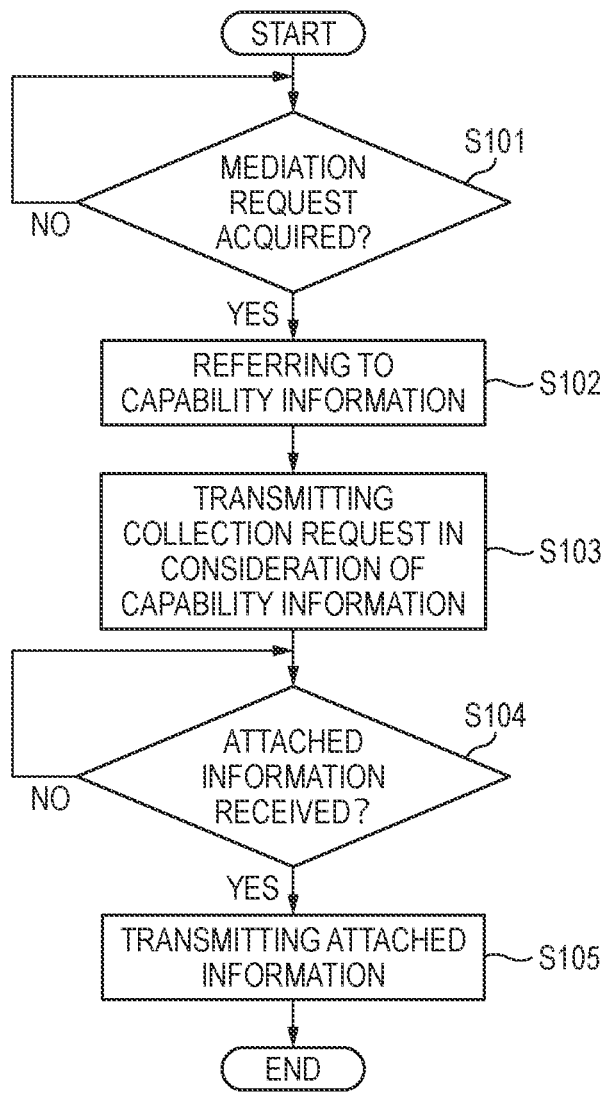
FIG. 4 is a flow chart illustrating operation of the control PC of the information collecting system according to one or more embodiments of the present invention.

FIG. 4 is a flow chart illustrating operation of the control PC 20*b* of the information collecting system 1*a* according to one or more embodiments of the present invention. The flow chart illustrated in FIG. 4 starts when a collection request is transmitted from the attached information update unit 100 of the management PC 10 to the attached information collecting mediation unit 201 of the control PC 20*b* via the information network N1.

(Step S101) When the attached information collecting mediation unit 201 of the control PC 20*b* acquires the mediation request transmitted from the attached information update unit 100 of the management PC 10 via the information network N1, the process proceeds to Step S102. Otherwise (that is, when the mediation request is not acquired), the process remains in Step S101.

(Step S102) The attached information collecting mediation unit 201 of the control PC 20*b* specifies capabilities of the target device (that is, the controller 30*a* to be collected of attached information) and of the target network (that is, the control network N2) by referring to the capability information stored in the engineering DB 202. Thereafter, the process proceeds to Step S103.

(Step S103) The attached information collecting mediation unit 201 of the control PC 20*b* transmits a collection request to the attached information collecting unit 300 of the controller 30*a* in consideration of capability information of the controller 30*a* and of the control network N2 (for example, as illustrated in FIG. 2, the attached information collecting mediation unit 201 transmits a collection request to the attached information collecting unit 300 of the controller 30*a* for N times at an appropriate transmission interval based on the capability information of the specified controller 30*a*, so as to partially acquire the attached information in a plurality of times (N times)). The above transmission of a collection request for a plurality of times is performed upon receiving attachment information corresponding to a previously transmitted collection request. That is, a next collection request is not transmitted until attachment information corresponding to the previously transmitted collection request is received. Thereafter, the process proceeds to Step S104.

(Step S104) When the attached information collecting mediation unit 201 of the control PC 20*b* acquires all of the attached information transmitted from the attached information collecting unit 300 of the controller 30*a* via the control network N2, the process proceeds to Step S105. Otherwise (that is, when the attached information is not acquired), the process remains in Step S104.

(Step S105) The attached information collecting mediation unit 201 of the control PC 20*b* transmits the attached information acquired in Step S104 to the attached information update unit 100 of the management PC 10 via the information network N1.

Processing of the flow chart illustrated in FIG. 4 ends.

With the above configuration, the information collecting system 1*a* according to one or more embodiments of the present invention can collect attached information without influencing process control of an industrial process (for example, a production process) by an operating process control system (for example, a production system).

With the above configuration, since the information collecting system 1*a* according to one or more embodiments of the present invention can collectively collect attached information of the entire process control system (for example, a production system), attached information having consistency of information can be collected.

With the above configuration, the information collection system 1*a* according to one or more embodiments of the present invention can introduce collection of attachment information to a process control system (for example, a production system) including a device that is difficult to be replaced such as an operating controller, while maintaining operation of the process control system. This is because, according to one or more embodiments of the present invention, the collection of attached information can be introduced by simply adding, to a control PC, a mediation function of mediating collection of attached information related to a controller without adding a function to many controllers respectively. The mediation function can be added to the control PC by simply adding (or updating) software, making it possible to add a function easily.

As described above, the information collecting system 1*a* according to one or more embodiments of the present invention can collect attached information having consistency of information at any timing without influencing processing efficiency of the process control.

The information collecting system 1*a* according to one or more embodiments collects attached information over a two-level network including one information network N1 and one control network N2. The present invention can be expanded to a configuration in which attached information is collected over three or more-level networks. The present invention can also be expanded to a configuration in which attached information is collected in a network (for example, a network in which two control networks N2 are connected to one information network N1) in which a plurality of networks of the same level exist.

Configuration of Information Collecting System

Hereinafter, a configuration of an information collecting system 1*b* is described with reference to the drawings.

Figure 5:
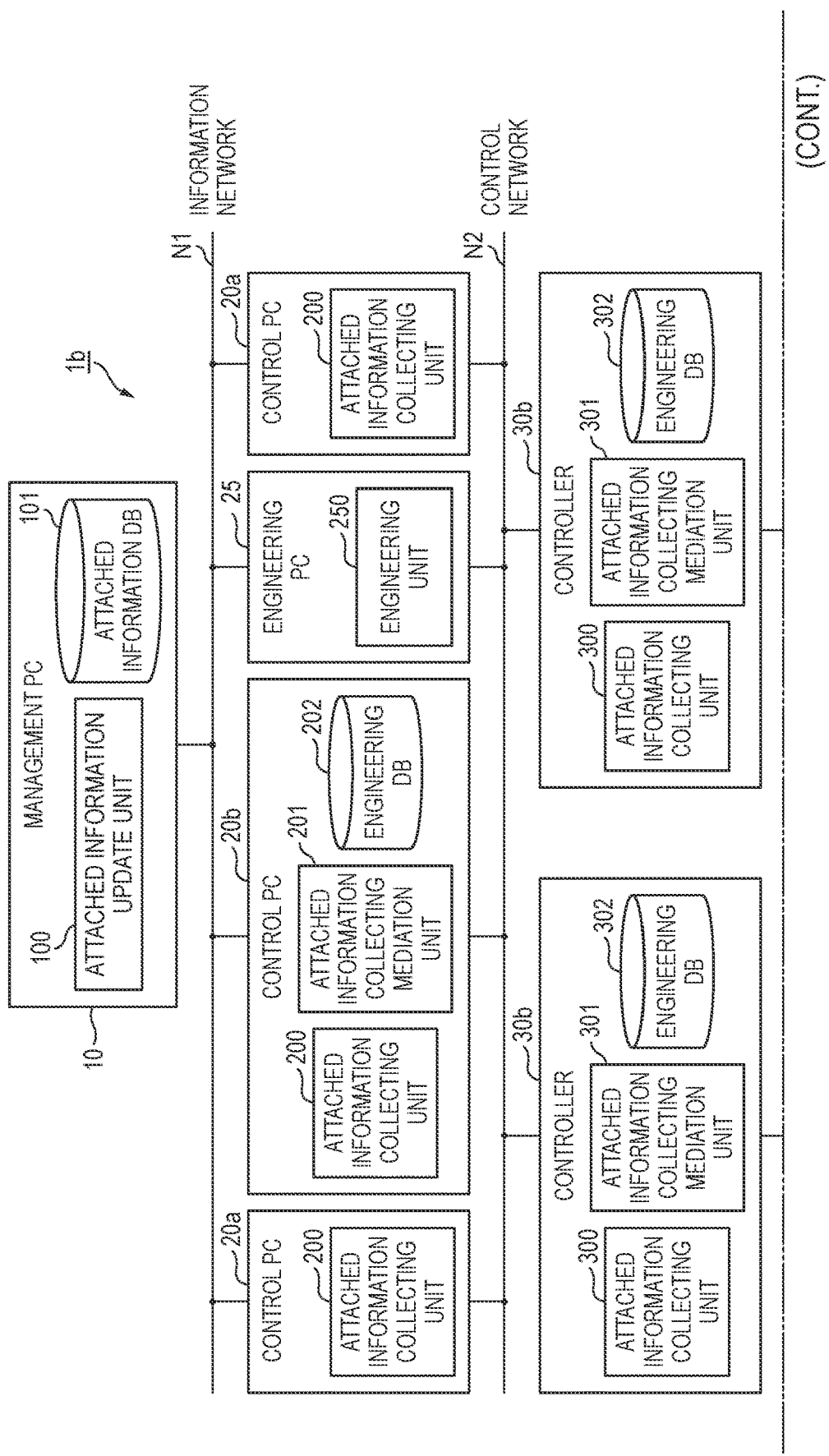
FIG. 5 is a schematic diagram illustrating an overall configuration of an information collecting system according to one or more embodiments of the present invention.

FIG. 5 is a schematic diagram illustrating an overall configuration of the information collecting system 1*b* according to one or more embodiments of the present invention. Similar to the information collecting system 1*a* according to the above-described embodiments, the information collecting system 1*b* according to one or more embodiments described below collects information related to a controller and a control device that controls the controller in a production system (not all illustrated) installed in a plant.

As illustrated in FIG. 5, the information collecting system 1*b* includes the management PC 10, the plurality of control PCs 20*a*, the control PC 20*b*, the engineering PC 25, a plurality of controllers 30*b*, a plurality of field devices 40, the information network N1, the control network N2, and a plurality of field networks N3.

In the production system (not all illustrated), the plurality of controllers 30*b* control the field devices 40 respectively connected to the controllers 30*b* under monitoring of the control PCs 20*a* and the control PC 20*b* that are operation management devices, such that an industrial process (production process) realized in the plant is under control.

In the configuration of the information collecting system 1*b* according to one or more embodiments, the same reference numerals are given to functional blocks having the same functions as those of the information collecting system 1*a* according to the previously-described embodiments, and descriptions thereof may be omitted.

As illustrated in FIG. 5, the management PC 10 is communicably connected to the control PCs 20*a*, the control PC 20*b*, and the engineering PC 25 respectively via the information network N1. The information network N1 is, for example, installed in a monitoring room of the plant.

As illustrated in FIG. 5, the controllers 30*b* are communicably connected to the control PCs 20*a*, the control PC 20*b*, and the engineering PC 25 respectively via the control network N2. The control network N2, for example, connects active sites of the plant and the monitoring room, such that real-time communication is performed.

As illustrated in FIG. 5, the controllers 30*b* and the field devices 40 are connected to each other respectively via the field networks N3. The field networks N3 are, for example, installed in a monitoring room of the plant.

In this way, the information collecting system 1*b* according to one or more embodiments includes a three-level network including the information network N1, the control network N2, and the field networks N3.

As illustrated in FIG. 5, the field networks N3 are separate networks from each other, to which two controllers 30*b* constituting the information collecting system 1*b* are connected respectively. That is, the information collection system 1*b* according to one or more embodiments includes a three-level network in which one control network N1 is connected to one information network N2 and two field networks N3 are connected in parallel to the control network N2.

Although the information network N1, the control network N2, and the field networks N3 are illustrated in a simplified manner in FIG. 5, these networks are actually configured by such as a network switch. The information network N1, the control network N2, and the field networks N3 may be wired or wireless networks or a combination of both.

As illustrated in FIG. 5, the controllers 30*b* are connected to the control network N2 and the field networks N3. The controllers 30*b* control state quantities (for example, a flow rate of fluid) in the industrial process (production process) under monitoring of the control PCs 20*a* or the control PC 20*b*. Specifically, for example, under the monitoring of the control PCs 20*a* or the control PC 20*b*, the controllers 30*b* collect measurement data from a field device 40 that is a sensor, obtain a control amount of a field device 40 that is an actuator based on the collected measurement data, and control the field device 40 that is the actuator.

As illustrated in FIG. 5, each of the controllers 30*b* includes the attached information collecting unit 300, an attached information collecting mediation unit 301, and an engineering DB 302.

The attached information collecting units 300 acquire a collection request transmitted from the attached information collecting mediation unit 201 of the control PC 20*b* via the control network N2. The attached information collecting units 300 collect attached information related to corresponding controllers 30*b* based on the acquired collection request. The attached information collecting units 300 transmit the collected attached information to the attached information collecting mediation unit 201 of the control PC 20*b* via the control network N2.

Each of the controllers 30*b* of the information collecting system 1*b* according to one or more embodiments has a configuration in which the information collecting mediation unit 301 and the engineering DB 302 are added to the configuration of the controllers 30*a* described in the previously-described embodiments.

Attached information collecting mediation units 301 acquire a mediation request transmitted from the attached information collecting mediation unit 201 of the control PC 20*b* via the control network N2. Upon acquiring the mediation request, the attached information collecting mediation units 301 respectively transmit, via the field networks N3, a collection request indicating a request to collect attachment information to attached information collecting units 400 of the field devices 40 to be described below. In this way, the attached information collecting mediation units 301 can collect latest attached information related to each of the field device 40.

The attached information collecting mediation units 301 transmit the collected attached information to the attached information collecting mediation unit 201 of the control PC 20*b* via the control network N2. The attached information collecting mediation unit 201 of the control PC 20*b*, when collecting the attached information transmitted from the attached information collecting mediation units 301 of the controllers 30*b*, transmits the collected attached information to the attached information update unit 100 of the management PC 10 via the information network N1.

The attached information collecting mediation units 301 store capability information of the field networks N3 and of the field devices 40. Specifically, the attached information collecting mediation units 301 store the following capability information.

Additional allowed communication loads for communication of attached information in the field networks N3

Additional allowed processing loads for collection of attached information in the field devices 40

Information related to a function of suppressing the above processing loads of the field device 40 or information indicating that the field devices 40 do not have the function of suppressing the above processing loads The above "allowed" refers that the process control (production process) of the production system (not all illustrated) is not influenced.

The attached information collecting mediation units 301 transmit a collection request to the attached information collecting units 400 of the field devices 40 to be described below in consideration of the capabilities indicated by the above capability information. Specifically, the attached information collecting mediation units 301 transmit a collection request by adjusting a transmission frequency (timing) of the collection request or by adjusting a communication amount in the field networks N3 via adjusting an information amount requested to be collected based on, for example, the capabilities indicated by the above capability information.

The engineering DBs 302 store the capability information acquired by the engineering unit 250 of the engineering PC 25. Similar to the engineering DB 202, each of the engineering DBs 302 includes a storage medium such as an HDD, a flash memory, an EEPROM, a RAM, a ROM, or any combination of these storage media.

The field devices 40 are, for example, a sensor such as a flowmeter and a temperature sensor, a valve such as a flow control valve and an on-off valve, an actuator such as a fan and a motor, or other devices installed in the plant.

As illustrated in FIG. 5, each of the field devices 40 includes the attached information collecting unit 400.

The attached information collecting units 400 acquire a collection request transmitted from the attached information collecting mediation units 301 of the controllers 30*b* via the field networks N3. The attached information collecting units 400 collect attached information related to corresponding field devices 40 based on the acquired collection request. The attached information collecting units 400 transmit the collected attached information to the attached information collecting mediation units 301 of the controllers 30*b* via the field networks N3.

The attached information collecting units 400 have a function of suppressing loads due to collection of attached information in order to prevent an influence on the process control (production process) performed via the controllers 30*b*. Specifically, for example, the attached information collecting units 400 suppress loads by controlling thread priority, suppressing a usage rate of a CPU, and the like.

Here, the engineering unit 250 of the engineering PC 25 transfers the above capability information to the engineering DB 202 of the control PC 20*b* and the engineering DBs 302 of the controllers 30*b*. The capability information transferred from the engineering unit 250 to the engineering DB 202 of the control PC 20*b* indicates capabilities of a target device (that is, a controller 30*b*) that the attached information collecting mediation unit 201 of the control PC 20*b* mediates and of a target network (that is, the control network N2). The capability information transferred from the engineering unit 250 to the engineering DBs 302 of the controllers 30*b* indicates capabilities of a target device (that is, a field device 40) that the attached information collecting mediation units 301 of the controllers 30*b* mediate and of a target network (that is, the field network N3).

Although the engineering unit 250 transfers the capability information to the engineering DB 202 of the control PC 20*b* and the engineering DBs 302 of the controllers 30*b* in the above description, the present invention is not limited thereto. For example, the engineering unit 250 may transmit information related to definitions of the above components (for example, types of the controllers 30*b* and of the field devices 40) and parameter settings of these components to the engineering DB 202 of the control PC 20*b* and the engineering DBs 302 of the controllers 30*b*, such that the attached information collecting mediation unit 201 of the control PC 20*b* and the attached information collecting mediation units 301 of the controllers 30*b* determine capabilities of the components based on the acquired information and transmits a collection request.

The capability information may be input by an engineer in the engineering PC 25, or acquired from an external device (DB) by the engineering PC 25.

The transfer of capability information from the engineering unit 250 of the engineering PC 25 to the engineering DB 202 of the control PC 20*b* and the engineering DBs 302 of the controllers 30*b* is performed when contents of engineering (a configuration and setting of a device) is changed.

With the above configuration, the information collecting system 1*b* according to one or more embodiments of the present invention can collect attached information having consistency of information at any timing without influencing processing efficiency of the process control.

The information collecting system 1*b* may have a gateway (not illustrated) connected to the control network N2 and the field networks N3 respectively. In this case, the attached information collecting mediation unit 201 of the control PC 20*b* can be connected to the field networks N3 via the gateway (not illustrated), transmit a collection request directly to the attached information collecting units 400 of the field devices 40, and collect attached information related to the field devices 40 directly from the attached information collecting units 400.

The gateway (not illustrated) may include an attached information collecting mediation unit, such that the attached information collecting mediation unit 201 of the control PC 20*b* may transmit the mediation request to the attached information collecting mediation unit of the gateway (not illustrated).

Furthermore, in one or more embodiments, the above control PC 20*b* may include an analysis unit (not illustrated) that analyzes operation states (load states) of the control network N2 and the controllers 30*a* (or the controllers 30*b*) during operation of the production system (not all illustrated). With this configuration, the attached information collecting mediation unit 201 can determine to adjust a transmission timing of a collection request based on the analysis result by the analysis unit (not illustrated), and to transmit collection requests in parallel when loads is in a good state. In this way, the attached information collecting mediation unit 201 can collect attached information more efficiently (for example, in a short time) while not influencing the process control (production process) that is the main process.

Similarly, in one or more embodiments, the management PC 10 may include an analysis unit (not illustrated) that analyzes operation states (load states) of the information network N1, the control PCs 20*a*, and the control PC 20*b* during operation of the production system (not all illustrated). The controllers 30*b* may include an analysis unit (not illustrated) that analyzes operation states (load states) of the field networks N3 and the field devices 40 during operation of the production system (not all illustrated).

In the information collecting systems according to the above embodiments, the attached information collecting mediation unit 201 of the control PC 20*b* transmits all of latest attached information related to each of the controllers 30*b* to the attached information update unit 100 of the management PC 10. In the information collecting systems according to the above embodiments, the attached information collecting mediation units 301 of the controllers 30*b* transmits all of latest attached information related to each of the field devices 40 to the attached information collecting mediation unit 201 of the control PC 20*b*.

In this way, in the above embodiments, the attached information collecting mediation unit 201 and the attached information collecting mediation units 301 transmit all of the collected attached information to devices of a higher level. The collected attached information may be compared with the previously collected attached information (at time of previous collection) to transmit only difference information between the collected attached information and the previously collected attached information. With this configuration, an amount of attached information to be transmitted in the networks is reduced, and the information collecting systems can accordingly collect attached information more efficiently (for example, in a short time) without influencing the process control (production processing) that is a main process.

When contents of the collected attached information is the same as contents of the previously collected attached information (when the attached information is not changed), only Acknowledge (Ack) information indicating that a mediation request is normally received may be transmitted to the devices of a higher level.

Although the embodiments of the present invention have been described in detail, specific configurations are not limited to those described above, and design changes and the like can be made without departing from the scope of the present invention.

In the above embodiments, the attached information collecting mediation unit 201 of the control PC 20*b* stores capability information of the control network N2 and the controllers 30*a* (or the controllers 30*b*), the attached information collecting mediation units 301 of the controllers 30*b* store capability information of the field networks N3 and the field devices 40, and the attached information collecting mediation unit 201 and the attached information collecting mediation units 301 transmit collection requests based on these capability information. However, the attached information update unit 100 of the management PC 10 may also be configured similarly to store capability information of the information network N1, the control PCs 20*a*, and the control PC 20*b*, and transmit a collection request respectively based on the capability information.

In FIGS. 1 and 5, a plurality of devices (the control PCs 20*a*, the controllers 30*a*, the controllers 30*b*, and the field devices 40) are illustrated with the same reference numerals, and the plurality of devices with the same reference numerals have common functions. However, these devices have different allowed processing loads as operation states are different. According to the information collecting systems according to the above embodiments, attached information is collected in consideration of different allowed processing loads for each of the devices.

Although the field devices 40 are connected to the field networks N3 in FIG. 5, the field devices 40 may be connected directly to the control network N2. With this configuration, the field devices 40 are controlled by the controllers 30*b* via the control network N2. Also, the attached information collecting mediation unit 201 of the control PC 20*b*, instead of the attached information collecting mediation units 301 provided in the controllers 30*b*, transmits a collection request to the attached information collecting units 400 of the field devices 40, and collects attached information collected by the attached information collecting units 400.

Additionally, a part or all of a program for realizing a control function of the information collecting system 1a or the information collecting system 1b in the above embodiments may be recorded in a computer-readable recording medium, and be realized by reading and executing the program recorded in the recording medium in a the computer system.

The "computer system" referred to here is built in the information collecting system 1a or the information collecting system 1b, and includes an OS and hardware such as an peripheral device. The "computer-readable recording medium" refers to a storage device such as a portable medium such as a flexible disk, a magneto-optical disk, a ROM, and a CD-ROM, and a hard disk built in the computer system.

The "computer-readable recording medium" may also include a recording medium that retains a program dynamically in a short time, such as a communication line for transmitting a program via a network such as the Internet or a communication line such as a telephone line, or a recording medium that retains a program for a predetermined time, such as a volatile memory in a computer system serving as a server or a client in this case. The program may be used to realize a part of the above functions, and combine with a program that is already recorded in the computer system to realize the above functions.

A part or all of the information collecting system 1a or the information collecting system 1b in the above embodiments may be realized as an integrated circuit such as Large Scale Integration (LSI). Functional blocks of the information collecting system 1a or the information collecting system 1b may be individually implemented as processors, and some or all of the functional blocks may be integrated into a processor. The method of circuit integration is not limited to the LSI, and may be realized by a dedicated circuit or a general-purpose processor. Further, when the technique of integrated circuit that replaces the LSI appears due to the progress of semiconductor technology, an integrated circuit according to the technique may be used.

What is claimed is:

1. An information collecting system for collecting information associated with a controller connected to a control network and a host device connected to an information network located at a level higher than the control network that are included in a process control system, the information collecting system comprising:
    one or more processors;
    a management device that is connected to the information network and that:
        collects information associated with the host device,
        transmits an acquisition request for information associated with the controller to the information network, and
        manages the collected information associated with the host device and information associated with the controller obtained by transmitting the acquisition request; and
    an information collecting mediation device that is connected to the control network and the information network and that:
        collects information associated with the controller in consideration of capability information indicating a capability of at least one of the control network and the controller based on the acquisition request from the management device,
        sends the collected information associated with the controller to the management device, and
        adjusts, based on the capability information of at least one of the control network and the controller, at least one of an information amount for collecting the information associated with the controller at one time and a timing at which the information associated with the controller is collected, wherein
    the capability information includes at least one of:
        communication loads for communication of the information associated with the controller in the control network;
        processing loads for collection of the information associated with the controller in the controller;
        information related to a function of suppressing loads of the controller; and
        information indicating that the controller does not have the function of suppressing loads, and
    the information collecting mediation device:
        adjusts the information amount by dividing and collecting the information associated with the controller,
        combines the collected divided information, and
        transmits the combined information to the management device.

2. The information collecting system according to claim 1, wherein
    the information collecting mediation device transmits, to the management device, difference information indicating a difference between previously collected information associated with the controller and currently collected information associated with the controller.

3. The information collecting system according to claim 2, wherein
    when the currently collected information is the same as the previously collected information, the information collecting mediation device outputs acknowledge information indicating that a mediation request is normally received.

4. The information collecting system according to claim 1, wherein
    the controller is connected to a field network, and
    the controller:
        collects information associated with a field device connected to the field network in consideration of capability information indicating a capability of at least one of the field network and the field device, based on an acquisition request from the information collecting mediation device, and
        sends the collected information associated with the field device to the information collecting mediation device.

5. The information collecting system according to claim 1, wherein
    the information collecting mediation device:
        collects information associated with a field device in consideration of capability information indicating a capability of at least one of the control network and the field device connected to the control network, based on the acquisition request from the management device, and
        sends the collected information associated with the field device to the management device.

6. The information collecting system according to claim 1, wherein
the information collecting mediation device is introduced into the host device while maintaining operation of the process control system.

7. An information collecting mediation device in a process control system that includes a controller connected to a control network and a host device connected to an information network located at a level higher than the control network, wherein
the information collecting mediation device, comprising one or more processors:
is connected to the control network and the information network;
collects information associated with the controller according to capability information indicating a capability of at least one of the control network and the controller based on an information acquisition request transmitted via the information network;
sends the collected information associated with the controller to the information network toward a transmission source of the information acquisition request;
adjusts, based on the capability information of at least one of the control network and the controller, at least one of an information amount for collecting the information associated with the controller at one time and a timing at which the information associated with the controller is collected, wherein the capability information includes at least one of:
communication loads for communication of the information associated with the controller in the control network;
processing loads for collection of the information associated with the controller in the controller;
information related to a function of suppressing loads of the controller; and
information indicating that the controller does not have the function of suppressing loads; and
adjusts the information amount by dividing and collecting the information associated with the controller,
combines the collected divided information, and
transmits the combined information to a management device that is connected to the information network.

8. An information collecting mediation method using a computer in a process control system that includes a controller connected to a control network and a host device connected to an information network located at a level higher than the control network, the information collecting mediation method comprising:
connecting the computer to the control network and the information network;
collecting information associated with the controller according to capability information indicating a capability of at least one of the control network and the controller based on an information acquisition request transmitted via the information network;
sending the collected information associated with the controller to the information network toward a transmission source of the information acquisition request; and
adjusting, based on the capability information of at least one of the control network and the controller, at least one of an information amount for collecting the information associated with the controller at one time and a timing at which the information associated with the controller is collected, wherein the capability information includes at least one of:
communication loads for communication of the information associated with the controller in the control network;
processing loads for collection of the information associated with the controller in the controller;
information related to a function of suppressing loads of the controller; and
information indicating that the controller does not have the function of suppressing loads; and
adjusting the information amount by dividing and collecting the information associated with the controller,
combining the collected divided information, and
transmitting the combined information to a management device that is connected to the information network.

9. A non-transitory computer-readable recording medium having an information collecting mediation program on a computer in a process control system that includes a controller connected to a control network and a host device connected to an information network located at a level higher than the control network, the information collecting mediation program executing:
collecting information associated with the controller according to capability information indicating a capability of at least one of the control network and the controller based on an information acquisition request transmitted via the information network,
sending the collected information associated with the controller to the information network toward a transmission source of the information acquisition request; and
adjusting, based on the capability information of at least one of the control network and the controller, at least one of an information amount for collecting the information associated with the controller at one time and a timing at which the information associated with the controller is collected, wherein
the computer is connection to the control network and the information network,
the capability information includes at least one of:
communication loads for communication of the information associated with the controller in the control network;
processing loads for collection of the information associated with the controller in the controller;
information related to a function of suppressing loads of the controller; and
information indicating that the controller does not have the function of suppressing loads, and
the information collecting mediation program further executes:
adjusting the information amount by dividing and collecting the information associated with the controller,
combining the collected divided information, and
transmitting the combined information to a management device that is connected to the information network.

10. The information collecting system according to claim 1, wherein the information collecting mediation device is directly connected to both of the control network and the information network.

11. The information collecting mediation device according to claim 7, wherein the information collecting mediation device is directly connected to both of the control network and the information network.

12. The information collecting mediation method according to claim 8, wherein connection of the computer to the control network and the information network is direct.

13. The non-transitory computer-readable recording medium according to claim 9, wherein the computer is directly connected to both of the control network and the information network.

\* \* \* \* \*

UNITED STATES PATENT AND TRADEMARK OFFICE
CERTIFICATE OF CORRECTION

PATENT NO. : 11,075,828 B2
APPLICATION NO. : 16/138433
DATED : July 27, 2021
INVENTOR(S) : Eiji Nagai et al.

Page 1 of 1

It is certified that error appears in the above-identified patent and that said Letters Patent is hereby corrected as shown below:

In the Claims

Column 20, Claim number 9, Line number 39, the word "connection" should read -- connected --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*